United States Patent
Obana et al.

(10) Patent No.: US 7,468,817 B2
(45) Date of Patent: Dec. 23, 2008

(54) IMAGE READING APPARATUS

(75) Inventors: Katsumi Obana, Funabashi (JP); Yasushi Ishida, Tokyo (JP); Shigeyuki Sugiyama, Hiratsuka (JP); Takayuki Nishinohara, Tokyo (JP); Hiroyuki Noguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 490 days.

(21) Appl. No.: 11/036,124

(22) Filed: Jan. 18, 2005

(65) Prior Publication Data

US 2005/0179960 A1   Aug. 18, 2005

(30) Foreign Application Priority Data

Jan. 16, 2004   (JP) .............................. 2004-009549

(51) Int. Cl.
  *H04N 1/04*   (2006.01)
(52) U.S. Cl. ................. 358/474; 358/486; 358/497; 358/1.15; 382/274
(58) Field of Classification Search ............... 358/474, 358/487, 484, 486, 497, 496, 1.15
  See application file for complete search history.

(56) References Cited

U.S. PATENT DOCUMENTS

| | | | | |
|---|---|---|---|---|
| 5,767,945 A * | 6/1998 | Fields et al. | ................... | 355/39 |
| 5,780,829 A | 7/1998 | Tsai et al. | ................... | 235/454 |
| 6,052,174 A * | 4/2000 | Terajima et al. | ................ | 355/67 |
| 6,239,817 B1 | 5/2001 | Meyer | ........................ | 347/36 |
| 6,297,874 B1 * | 10/2001 | Ikeda et al. | ................... | 355/40 |
| 6,411,324 B1 | 6/2002 | Christiansen et al. | ....... | 347/248 |
| 6,415,115 B1 | 7/2002 | Moritani | ..................... | 399/82 |
| 6,417,937 B1 | 7/2002 | Batten et al. | ................ | 358/487 |
| 6,612,240 B1 | 9/2003 | Silverbrook et al. | ..... | 101/424.1 |
| 6,614,563 B1 | 9/2003 | Batten et al. | ................ | 358/487 |
| 6,982,809 B2 | 1/2006 | Kagaya | .................... | 358/1.18 |
| 7,002,712 B2 * | 2/2006 | Barker et al. | ................ | 358/474 |
| 7,092,131 B2 | 8/2006 | Fang | ........................ | 358/474 |
| 7,110,150 B2 | 9/2006 | Tecu et al. | ................... | 358/487 |
| 2002/0051242 A1 * | 5/2002 | Han et al. | ................... | 358/474 |
| 2003/0048488 A1 * | 3/2003 | Satou | ........................ | 358/474 |

(Continued)

FOREIGN PATENT DOCUMENTS

CN   2278971 Y   4/1998

(Continued)

OTHER PUBLICATIONS

Chinese Office Action and its English translation, dated Aug. 31, 2007, regarding Patent Application No. 2005100087398.

*Primary Examiner*—Edward L Coles
*Assistant Examiner*—Negussie Worku
(74) *Attorney, Agent, or Firm*—Fitzpatrick, Cella, Harper & Scinto

(57) ABSTRACT

Images obtained by prescanning a transparent original by an image reading apparatus are output from a printing apparatus as a navigation sheet on which the images are laid out together with additional information fields. The navigation sheet containing additional information is read, and the additional information is recognized. The transparent original which is left after prescanning is scanned, and printing is performed on the basis of the recognized additional information. This makes it possible to print out a desired image under desired conditions from the transparent original, in which a plurality of images are recorded, by operating a single apparatus without any external device such as a host computer.

7 Claims, 10 Drawing Sheets

U.S. PATENT DOCUMENTS

| | | |
|---|---|---|
| 2003/0063333 A1 | 4/2003 | Boll .......................... 358/494 |
| 2003/0184820 A1 | 10/2003 | Han et al. .................. 358/494 |
| 2003/0202222 A1 | 10/2003 | Amimoto et al. ............ 358/474 |
| 2004/0061905 A1* | 4/2004 | Ohara ........................ 358/402 |
| 2004/0246543 A1 | 12/2004 | Kurokawa et al. ........... 358/509 |
| 2005/0036178 A1 | 2/2005 | Pai ............................. 358/474 |
| 2005/0185226 A1* | 8/2005 | Hashizume ................. 358/474 |
| 2007/0229919 A1 | 10/2007 | Shinagawa ................. 358/486 |
| 2007/0247689 A1 | 10/2007 | Oguchi ....................... 359/197 |
| 2007/0252069 A1 | 11/2007 | Oguchi ....................... 248/458 |

FOREIGN PATENT DOCUMENTS

| | | |
|---|---|---|
| CN | 2299426 Y | 12/1998 |
| CN | 1453738 A | 11/2003 |
| JP | 64-47155 | 3/1989 |
| JP | 03-062668 A | 3/1991 |
| JP | 6-5251 | 1/1994 |
| JP | 06-46219 A | 2/1994 |
| JP | 08-331494 | 12/1996 |
| JP | 10-126578 A | 5/1998 |
| JP | 10-224528 | 8/1998 |
| JP | 10-224528 A | 8/1998 |
| JP | 10-233920 | 9/1998 |
| JP | 2000-358132 | 12/2000 |
| JP | 2001-265547 A | 9/2001 |
| JP | 2001-313784 | 11/2001 |
| JP | 2002-077539 A | 3/2002 |
| JP | 2003-005304 | 1/2003 |
| JP | 2003-075944 | 3/2003 |
| JP | 2003-110844 A | 4/2003 |
| JP | 2003-202633 A | 7/2003 |
| JP | 2003-303065 A | 10/2003 |
| JP | 2003-305925 A | 10/2003 |
| JP | 2004-005559 A | 1/2004 |
| JP | 2004-007547 A | 1/2004 |

* cited by examiner

FIG. 8

|  |  |  |  |  |  |
|---|---|---|---|---|---|
| IMAGE 1 | COUNT: 0○ 1● 2○ 3○<br>SIZE: L○ 2L○ POSTCARD○<br>PAPER TYPE:<br>PLAIN PAPER○<br>PHOTO PAPER○ | IMAGE 2 | COUNT: 0○ 1○ 2● 3○<br>SIZE: L○ 2L● POSTCARD○<br>PAPER TYPE:<br>PLAIN PAPER○<br>PHOTO PAPER● | IMAGE 3 | COUNT: 0○ 1○ 2○ 3○<br>SIZE: L○ 2L○ POSTCARD○<br>PAPER TYPE:<br>PLAIN PAPER○<br>PHOTO PAPER○ | IMAGE 4 | COUNT: 0○ 1○ 2○ 3○<br>SIZE: L○ 2L○ POSTCARD○<br>PAPER TYPE:<br>PLAIN PAPER○<br>PHOTO PAPER○ | IMAGE 5 | COUNT: 0○ 1○ 2○ 3○<br>SIZE: L○ 2L○ POSTCARD○<br>PAPER TYPE:<br>PLAIN PAPER○<br>PHOTO PAPER○ | IMAGE 6 | COUNT: 0○ 1○ 2○ 3○<br>SIZE: L○ 2L○ POSTCARD○<br>PAPER TYPE:<br>PLAIN PAPER○<br>PHOTO PAPER○ |

(Grid of images 1–24 with COUNT, SIZE, and PAPER TYPE selection indicators; image 2 has filled markers at COUNT 2, SIZE 2L, and PHOTO PAPER; image 1 has filled marker at COUNT 1. N denotes the overall layout.)

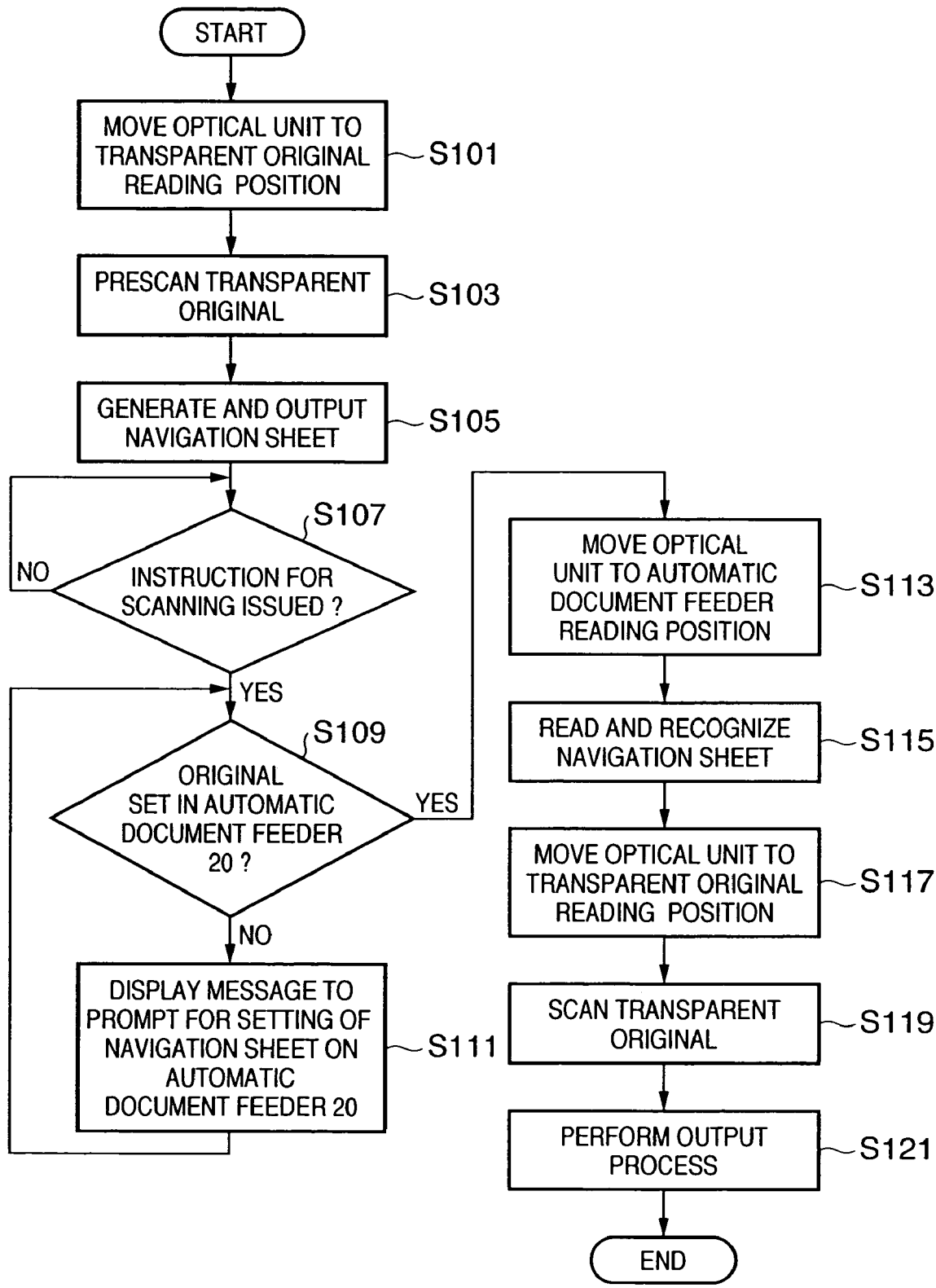

IMAGE READING APPARATUS

FIELD OF THE INVENTION

The present invention relates to an image reading apparatus such as a facsimile apparatus, copying machine, multifunction apparatus, or the like and, more particularly, to an apparatus which has a transparent original reading function.

BACKGROUND OF THE INVENTION

In response to a recent large increase in cost performance of scanners and printers, image reading/printing apparatuses called multifunction apparatuses which incorporate a scanner and printer and also have a facsimile function are rapidly spreading. Some of the image reading/printing apparatuses can read a transparent original. Such image reading/printing apparatus can read a photographic film exposed by a film camera and can print the read data (see, Japanese Patent Laid-Open No. H08-331494).

To selectively print out some of a plurality of frame images recorded on, e.g., a photographic film using an image reading/printing apparatus which can read a transparent original, the following procedure is conventionally performed. More specifically, in accordance with an instruction from a host computer connected to the image reading/printing apparatus, film images are read by an image reading apparatus, and images to be printed out are selected from the images displayed on the display device of the host computer. The images are sent together with additional information including the output paper size, number of prints, and the like, and the image reading/printing apparatus is instructed to print out the images.

There is also known an image reading/printing apparatus which can perform the same procedure using not a host computer but an operation unit and display screen of the image reading/printing apparatus (see, e.g., Epson Sales Japan Corporation, "PM-850 Basic Operation Guide", Nov. 11, 2003 (searched on Dec. 3, 2003 in the Internet, URL:http://www2.i-love-epson.co.jp/support/manual/data/ink/pma850/4046160_00.pdf) and Epson Sales Japan Corporation, "PM-850 Scanner Operation Guide (for Windows)", Nov. 11, 2003 (searched on Dec. 3, 2003 in the Internet, URL:http://www2.i-love-epson.co.jp/support/manual/data/ink/pma850/NPD0498_00W_Scanner.pdf)).

In a method of using a host computer, it is required that the host computer is ready. Particularly, if the host computer is powered off, a waiting time is necessary to activate and this is annoying. If the host computer is separated from the image reading/printing apparatus (e.g., the host computer is connected to the image reading/printing apparatus through a network), the operator needs to move between them, and this is troublesome.

Such problem is solved by performing processing only by a single apparatus without any host computer. However, generally, a display device on the apparatus main body is small and has low resolution. It is difficult to select a desired image from a plurality of displayed images particularly when similar shots obtained e.g., in anniversary photography are arranged in a row. This problem is partially solved by displaying one image at a time. However, selection cannot be performed while comparing a plurality of images with each other, and operation of switching image display is required. Accordingly, this method is also inconvenient.

Also, it is more difficult to designate additional information including the paper size, number of prints, and the like than a case using a host computer. This problem is partially solved by increasing the screen size of the display device on the image reading/printing apparatus and the keys of the operation unit. However, this increases the size of the apparatus and the cost. In consideration of this, the method is impractical.

Japanese Patent Laid-Open No. H10-224528 (JP-A-H10-224528) discloses an image processing apparatus that reads each frame of a film cartridge and turns the read images to a prescribed size and prints the plural frames on one sheet of recording paper along with a copy number input frame in a printer part. A user writes the printing copy number to the copy number input frame corresponding to the printed respective frames, and when it is mounted on an original platen glass and read, character recognition is performed and the instructed frame is printed for the instructed copy number.

SUMMARY OF THE INVENTION

The present invention has been made in consideration of the conventional problems, and has as its main object to provide an image reading apparatus which can easily and reliably print out a desired image under desired conditions from a transparent original such as a photographic film in which a plurality of mages are recorded.

According to an aspect of the present invention, it is provided an image reading apparatus comprising original convey unit and image reading unit adapted to read an original conveyed by the original convey unit and an original set on an original table, wherein an index sheet which contains a printing condition together with an image contained in the transparent original is read by the image reading unit while being conveyed by the original convey unit, and the transparent original set on the original table is read by the image reading unit.

Other objects and advantages besides those discussed above shall be apparent to those skilled in the art from the description of a preferred embodiment of the invention which follows. In the description, reference is made to accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view showing an example of a navigation sheet output by the image reading/printing apparatus according to the embodiment of FIG. 1;

FIG. 10 is a flowchart for explaining the operation of the image reading/printing apparatus according to the embodiment of FIG. 1.

DETAILED DESCRIPTION OF THE PREFERRED EMBODIMENT

A preferred embodiment of the present invention will now be described in detail in accordance with the accompanying drawings.

Note that the dimensions, materials, shapes, relative positions, and the like of the components described in the embodiment below are merely examples. The scope of the present invention is not limited to these, unless otherwise specified.

Figure 6:
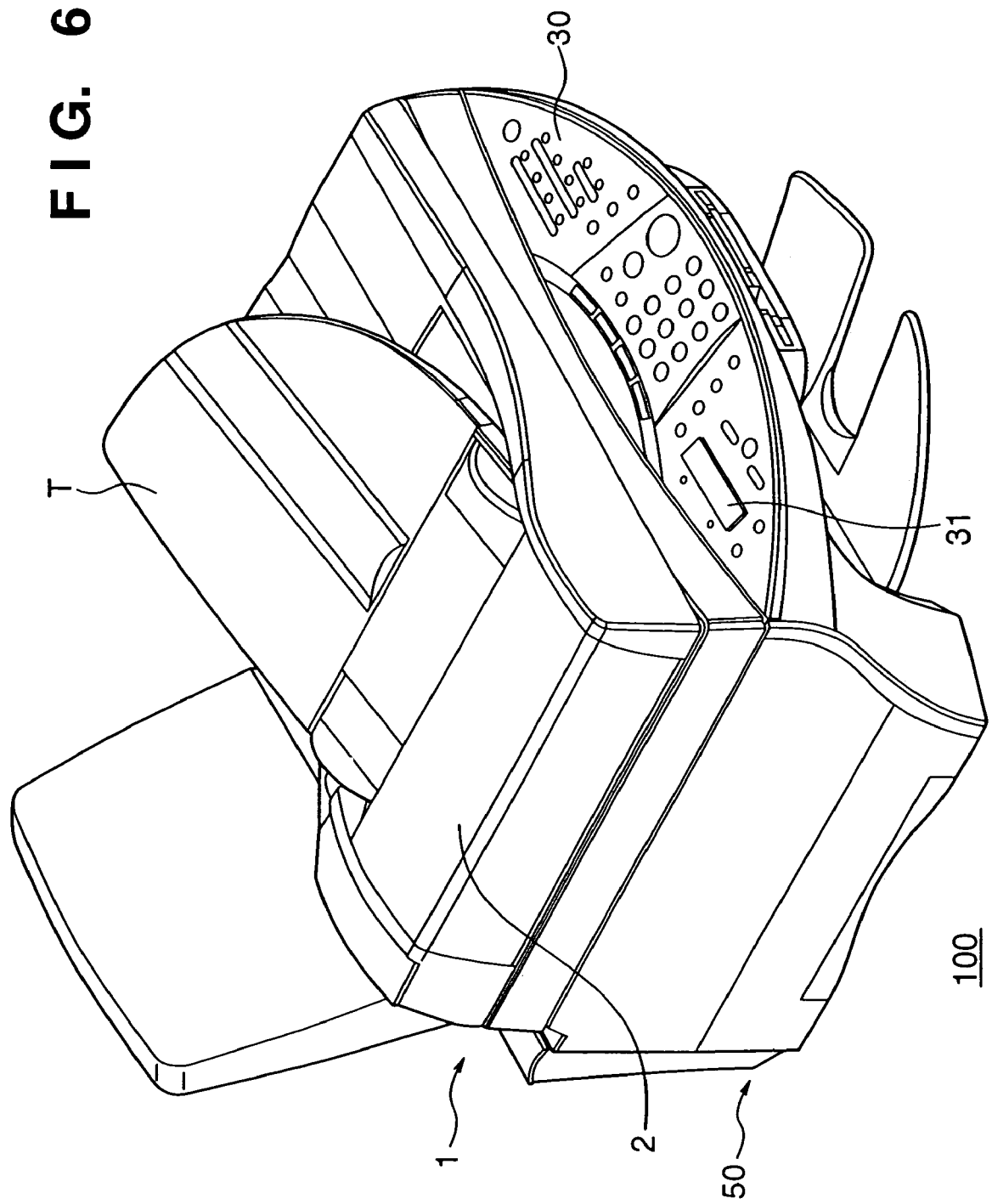
FIG. 6 is a perspective view showing an example of the outer appearance of the image reading/printing apparatus according to the embodiment of FIG. 1.

FIG. 6 is an outer appearance perspective view showing an example of an image reading/printing apparatus using an image reading apparatus according to this embodiment. An image reading/printing apparatus 100 comprises an image reader 1 arranged at the top, and a printing unit 50 on the bottom. An operation unit 30 is arranged forward of and above the printing unit 50. The operation unit 30 comprises various keys for giving various kinds of instructions in using the image reading/printing apparatus 100 as a scanner, printer, copier, facsimile apparatus, or the like, a display unit 31 an LED, and the like which displays the operation state, a message etc.

In this embodiment, the image reader 1 has an automatic document feeder 2 and can automatically convey and read an original set in an original tray.

Figure 9:
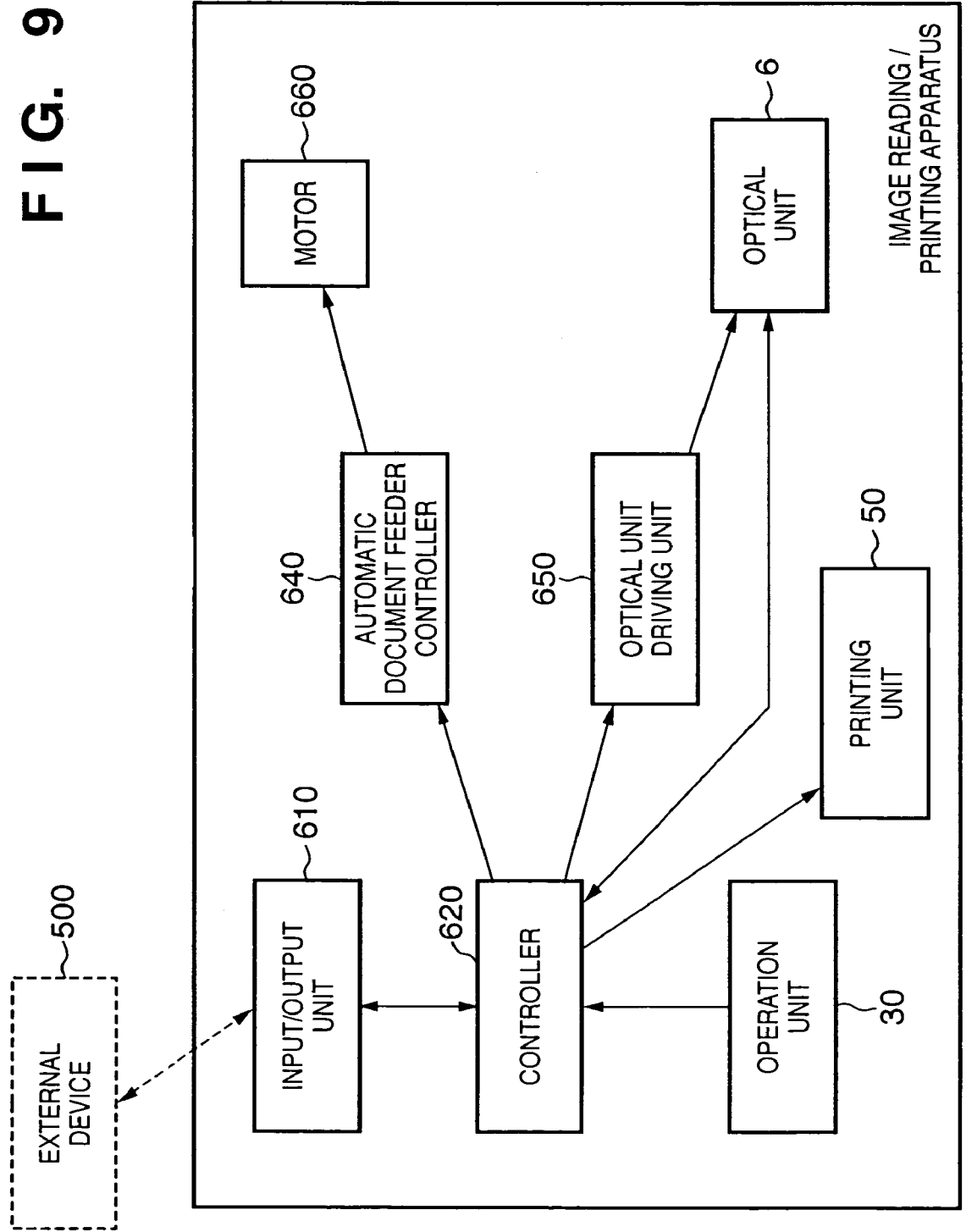
FIG. 9 is a block diagram showing a functional arrangement example of the image reading/printing apparatus according to the embodiment of FIG. 1.

FIG. 9 is a block diagram showing an example of the main functional arrangement of the image reading/printing apparatus 100 according to this embodiment. The image reading/printing apparatus 100 has an input/output unit 610 for transmitting read data or exchanging data with an external device 500 such as a host computer which uses the image reading/printing apparatus, a controller 620 which controls the entire image reading/printing apparatus, the operation unit 30 which has the display unit 31, and keys and buttons for giving the user's instructions to the image reading/printing apparatus 100, an automatic document feeder controller 640 which controls the operation of the automatic document feeder 2 in accordance with an instruction from the controller 620, an optical unit driving unit 650 which moves an optical unit 6 in accordance with an instruction from the controller 620, a motor 660 serving as the driving source of the automatic document feeder 2, and the printing unit 50 which comprises an ink-jet printer, laser beam printer, thermal transfer printer, or the like. The controller 620 includes, e.g., a ROM which stores a control program, a CPU which executes the control program, and a work RAM. The controller 620 controls the units in accordance with the control program, thereby controlling the operation of the image reading/printing apparatus 100.

As will be described later with reference to the flowchart in FIG. 10, the controller 620 operates as a unit for outputting, using the printing unit, a navigation sheet (index sheet) in which a plurality of images contained in a transparent original read by the image reader are laid out together with a field for designating additional information to be used in printing, a recognition unit for recognizing the contents designated in the field of the index sheet from the result of reading, by the image reader, the navigation sheet conveyed by the automatic document feeder, and an image output unit for reading the transparent original again using the image reader and outputting the plurality of images in the transparent original on the basis of the index sheet recognition result using the printing unit.

Figure 1:
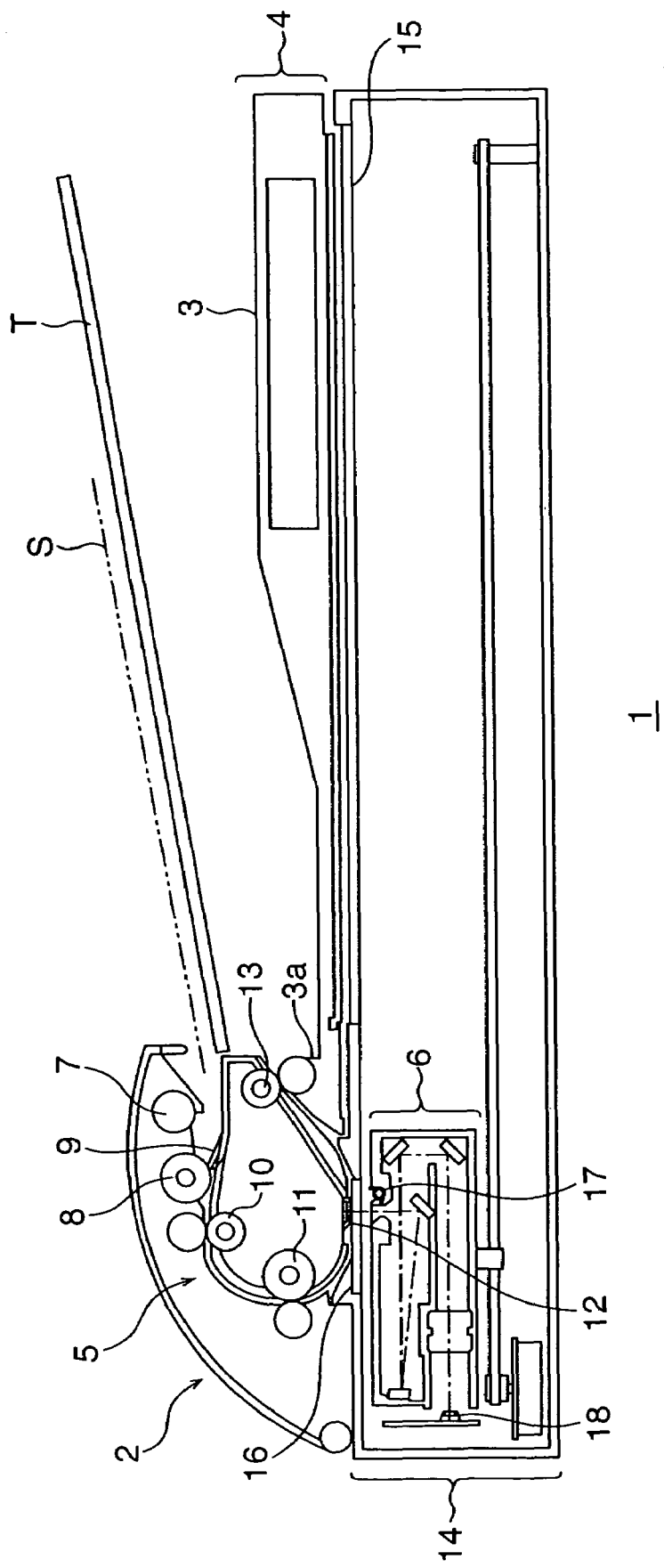
FIG. 1 is a sectional view showing an arrangement example of an image reader of an image reading/printing apparatus according to an embodiment of the present invention and a state wherein a reflection original is being read using an automatic document feeder.
Figure 2:
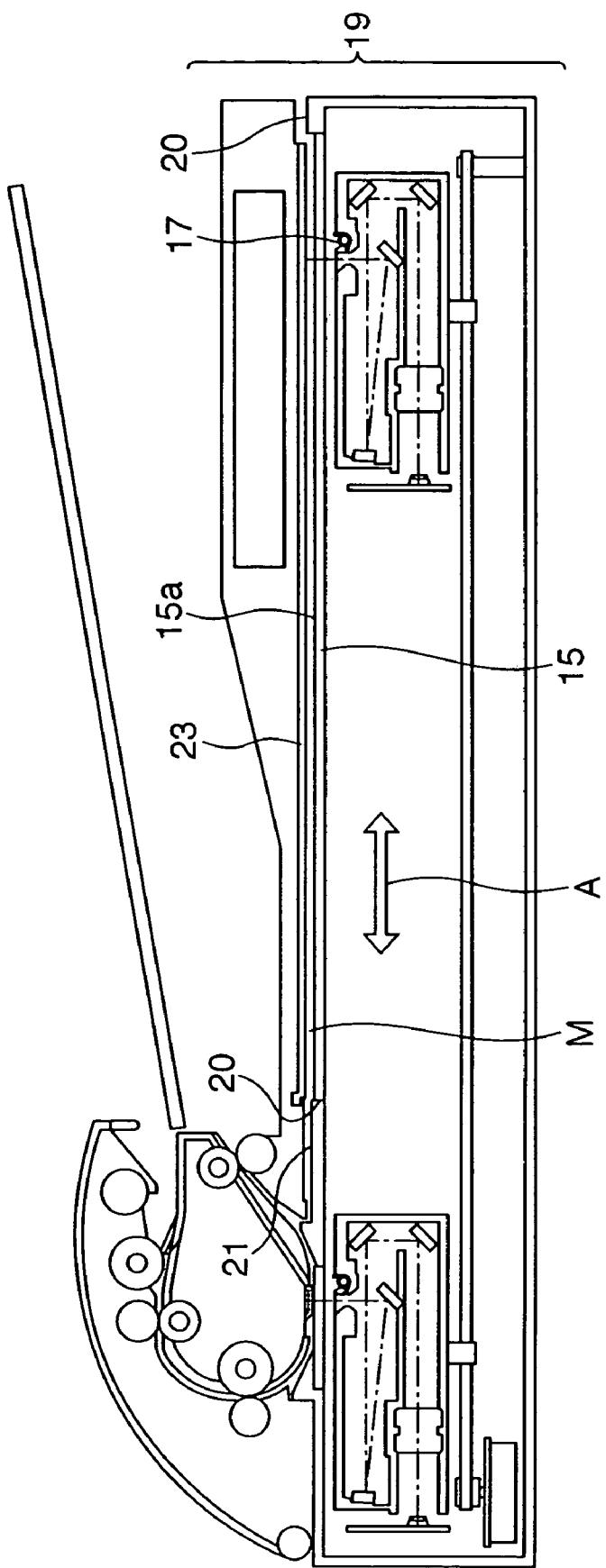
FIG. 2 is a sectional view showing the arrangement example of the image reader of the image reading/printing apparatus according to the embodiment of FIG. 1 and a state wherein a reflection original is being read without the automatic document feeder.
Figure 3:
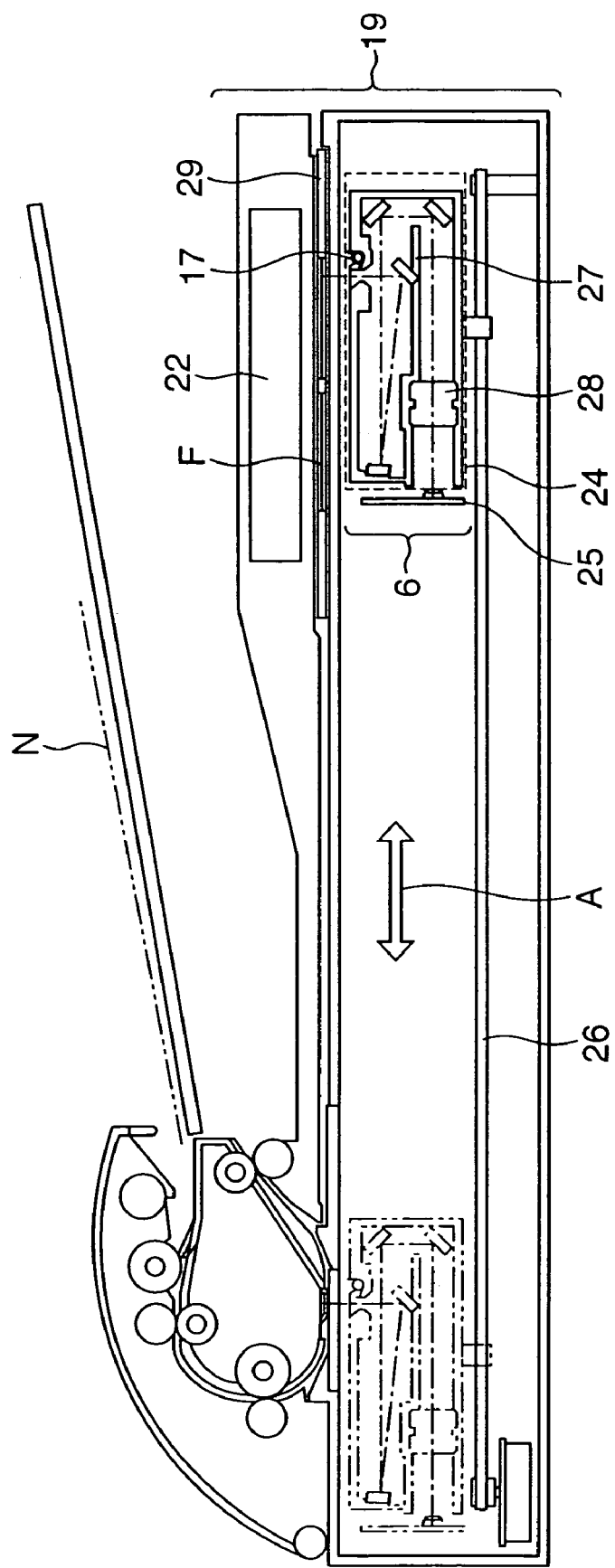
FIG. 3 is a sectional view showing the arrangement example of the image reader of the image reading/printing apparatus according to the embodiment of FIG. 1 and a state wherein a transparent original is being read.

FIGS. 1 to 3 are sectional views showing an arrangement example of the image reader 1. Each of FIGS. 1 and 2 shows a state wherein a reflection original is being read. FIG. 1 is a sectional view of a case wherein an original is read using the automatic document feeder 2 while FIG. 2 is a sectional view of a case wherein an original on an original table is read without the automatic document feeder 2.

FIG. 3 is a sectional view of a case wherein a transparent original such as a film is read and is also a sectional view of a case wherein a transparent original such as a film is read after a navigation sheet (to be also referred to as an "index sheet" and to be described later) is read as a reflection original.

The operation of the image reader 1 when a reflection original is read using the automatic document feeder 2 and when a reflection original is read without the automatic document feeder 2 will be described in detail with reference to FIGS. 1 and 2.

As shown in FIG. 1, the automatic document feeder 2 in the image reader 1 has an original delivery tray 3 and an original tray T on which an original S is set. In the automatic document feeder 2, the original S is conveyed from the original tray T to the original delivery tray 3 through an almost U-shaped original convey path (to be referred to as a U-turn path hereinafter) 5 arranged in a feed platen unit 4. During the convey process, an image of the original is read by the optical unit 6 fixed at a conveyed-image reading position shown in FIG. 1.

The automatic document feeder 2 further has, along the U-turn path 5, an original presence/absence sensor (not shown) which detects the presence/absence of the original S on the original tray T, a pickup roller 7 which picks up the original S on the original tray T, a separation roller 8 and separation pad 9 for separating one sheet from the picked-up original, a first convey roller 10 and second convey roller 11 which convey the separated original sheet, an original edge sensor (not shown) which detects the leading edge and trailing edge of each original sheet, a reading white plate 12 for pressing the original sheet and forming a white reference in image reading, and a third convey roller 13 for delivering the original sheet having undergone image reading to the original delivery tray 3.

The original tray T is so arranged as to connect to the upstream side of the U-turn path 5. The original delivery tray 3 is arranged on the downstream side of the U-turn path 5 using the upper surface of the feed platen unit 4. An original holding surface 3a for holding the trailing end of a delivered original is formed on the proximal end side of the original delivery tray 3.

A fixed reader 14 which is a portion of the image reader 1 except the automatic document feeder 2 has a platen glass 15 serving as an original table, the optical unit 6 with a photoelectric conversion element such as a CCD or the like, and a transparent guide sheet 16 which is so arranged as to oppose the reading white plate 12 of the automatic document feeder 2 and guides a conveyed original. If a reflection original is read without the automatic document feeder 2 or a transparent original such as a film is read, the optical unit 6 performs scanning along the lower surface of the platen glass 15 (see an arrow A in FIG. 2) to read the original on the platen glass 15.

To read a reflection original, the optical unit 6 irradiates the surface of the original with light from an LED array 17 serving as a light source through the platen glass 15, forms an image on the photoelectric conversion element such as a CCD or the like by a SELFOC® lens 18 using the reflected light, and outputs the image information as an electrical signal. To read a transparent original, the optical unit 6 does not use the LED array 17. The optical unit 6 forms an image on the photoelectric conversion element such as a CCD or the like by the SELFOC® lens 18 using light which has been emitted from a transparent original light source (to be described later), has passed through the transparent original, and has reached the SELFOC® lens 18, and outputs the image information as an electrical signal.

The optical unit 6 can read an image using, as a unit, an area (line) irradiated by the LED array 17 which is long and narrow in a direction perpendicular to the sheet surface of FIG. 2. If the optical unit 6 performs reading while moving (scanning) in the lateral direction (arrow A in FIG. 2), a larger area on the platen glass 15 can be read. To read an original conveyed by the automatic document feeder 2, since the original moves, the optical unit 6 is kept stopped at the convey original reading position shown in FIG. 1 and reads the conveyed original.

In this embodiment, if the automatic document feeder 2 is used, the original S is set on the original tray T such that a surface to be read can be viewed. When the original is set, an original stopper (not shown) controls the leading end position of the original S, and the original presence/absence sensor (not shown) detects the presence/absence of the original S.

When the operator gives an instruction to start reading from the operation unit 30 (see FIG. 6 or 7), the controller 620 instructs the automatic document feeder controller 640 to start conveying the original. In response to the instruction, the automatic document feeder controller 640 starts rotating the motor 660. With this operation, the original stopper (not shown) is pressed down, and the pickup roller 7 causes the original S to pass along the inclined surface of the original stopper (not shown) and feeds the original S into the U-turn path 5. At this time, the separation roller 8 and separation pad 9 separate one sheet from the original S, and the top original sheet S is separately conveyed. The first convey roller 10 conveys the separated original sheet S along the U-turn path 5. The second convey roller 11 then conveys the original sheet to a position on the platen glass 15 which opposes the reading position of the optical unit 6.

When the original edge sensor (not shown) detects the leading end of the original sheet S, and the leading end is conveyed from the detected position by a predetermined distance, the optical unit 6 starts reading image information. At this time, the original sheet S is pressed by the reading white plate 12. After the start of reading, the original sheet is guided by the transparent guide sheet 16 and heads for the third convey roller 13. When the original edge sensor (not shown) detects the trailing end of the original sheet S, and the trailing end is conveyed from the detected position by a predetermined distance, the optical unit 6 ends reading the image information.

The original sheet S is conveyed toward the original delivery tray 3 on the upper surface of the feed platen unit 4 by the third convey roller 13 and is delivered onto the original delivery tray 3. When the trailing end of the delivered original sheet S passes by the third convey roller 13, the original sheet S falls freely and moves along the inclined main surface of the original delivery tray 3. The trailing end of the original sheet S is held by the original holding surface 3a, and the original sheet S is accommodated in the original delivery tray 3. The above-mentioned reading operation is repeated until the original presence/absence sensor (not shown) detects the absence of original sheets at the convey original reading position.

An arrangement for reading a transparent original such as a photographic film and its reading operation will be described in detail with reference to FIGS. 2 and 3.

In the following description, a portion of the image reader 1 except a portion used only in original conveyance will be referred to as a fixed reading unit 19 for the sake of descriptive simplicity.

The fixed reading unit 19 is a so-called flatbed-type one having the platen glass 15, as described above.

The platen glass 15 is formed of an almost rectangular transparent plate such as a glass plate or the like. As described above, an object (original) M such as a printing document, photo, book, or the like is placed on a surface 15a of the platen glass 15. An original guide 20 in the shape of an almost rectangular frame is provided on the edge of the platen glass 15. The original guide 20 aims at aligning the object M on the surface 15a of the platen glass 15 and indicates the reading range. A white reference plate 21 extending in the main scanning direction (direction perpendicular to the sheet surface of FIG. 2 is joined to the original guide 20. The white reference plate 21 has a high-reflectance, uniform reflecting surface.

The feed platen unit 4 is coupled to the fixed reading unit 19 through hinges 32 (see FIG. 7) so as to be opened/closed freely. The feed platen unit 4 presses the object M on the platen glass 15, as described above, and covers the platen glass 15 so as to prevent light other than light emitted from the LED array 17 in the optical unit 6 serving as a reflection original reading light source from being applied to the object M. The hinges 32 orient the feed platen unit 4 in a full-open posture at almost 70° to 90° with respect to the surface 15a of the platen glass 15.

A transparent original light source 22 is accommodated in the feed platen unit 4. The transparent original light source 22 is a surface light source device comprising a linear light source such as a fluorescent lamp, a light diffusion plate (not shown), and a reflection plate. The linear light source (not shown) is arranged such that its longitudinal axis is almost parallel to the reciprocating direction (sub-scanning direction) of the optical unit 6. The light diffusion plate (not shown) comprises an almost rectangular semi-transparent light guide plate and transmits light incident from the linear light source or reflection plate by diffusing the light. The reflection plate (not shown) is formed in the shape of a thin plate bent like a gutter. The reflection plate is arranged in the feed platen unit 4 such that the longitudinal axis is parallel to that of a tube illuminator. The reflection plate reflects light emitted from the tube illuminator toward the light diffusion plate (not shown). Since such surface light source device is known as a so-called sidelight-type surface light source device, a detailed description thereof will be omitted.

An original mat 23 is locked by the feed platen unit 4 so as to be freely removed. The original mat 23 generally has a white surface and is elastic. The original mat 23 is mounted on the feed platen unit 4 in reading a reflection original (state in FIG. 2) and is removed from the feed platen unit 4 in reading a transparent original such that the transparent original light source 22 is exposed (state in FIG. 3). The shape and mounting position of the original mat 23 are set in the following manner. More specifically, when the original mat 23 is mounted on the feed platen unit 4, it covers the light diffusion plate (not shown). On the other hand, when the original mat 23 is removed from the feed platen unit 4, the light diffusion plate (not shown) is exposed. The original mat 23 in a totally enclosed posture presses the object M set on the platen glass 15 such that the object M is brought into tight contact with the platen glass 15.

As described above, the optical unit 6 is accommodated in the fixed reading unit 19 so as to freely reciprocate parallel to the surface 15a of the platen glass 15. The optical unit 6 includes an optical system 24 and an image sensor 25 such as a CCD or the like. The optical unit 6 is slidably locked by a guide shaft 26 which is parallel to the surface 15a of the platen glass 15 and is also parallel to the sub-scanning direction (arrow A) of the optical unit 6. The optical unit 6 is pulled by, e.g., a belt (not shown) and moves along the guide shaft 26.

The optical system 24 comprises the LED array 17 serving as the reflection original light source, a plurality of mirrors 27, a condenser lens 28, and the like. The LED array 17 serving as the reflection original light source is mounted in the optical unit 6 such that its longitudinal axis extends parallel to that of the image sensor 25. As indicated by the broken line in FIG. 3, a reflected light image on the main scanning line of the object M irradiated by the LED array 17 serving as the reflection original light source or a transmitted light image on the main scanning line of the object M irradiated by the transparent original light source 22 is formed on the image sensor 25 by the mirrors 27 and condenser lens 28.

An arrangement and operation of reading a transparent original such as a photographic film will be described in detail.

Figure 7:
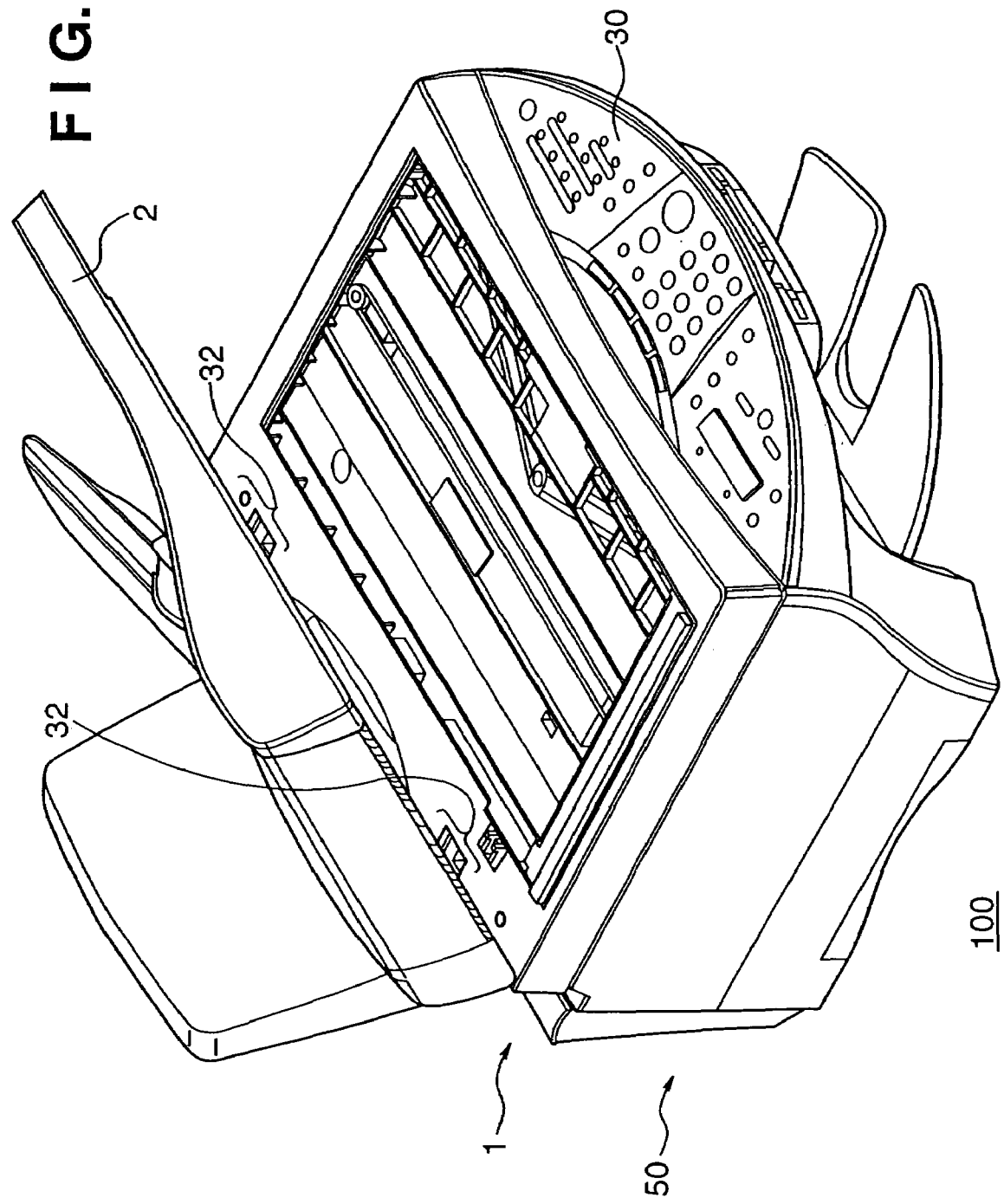
FIG. 7 is a view showing a state wherein a feed platen unit is fully opened in the arrangement of FIG. 6.

As described above, to read a transparent original, the operator pivots the feed platen unit 4 about the hinges 32 to set the apparatus in the frill-open state (state in FIG. 7). The feed platen unit 4 is held at almost 70° to 90° with respect to the surface 15a of the platen glass 15 by the elasticity of the hinges 32 such that the feed platen unit 4 is not closed due to its own weight (see FIG. 7). The original mat 23, which is locked by the feed platen unit 4 so as to be freely removed, is removed to expose the light diffusion plate (not shown). In the meantime, a transparent original F such as a film is set at a predetermined position in a dedicated film holder 29 which is separate and removable from the feed platen unit 4 (state in FIG. 5). In this state, the film holder 29 is mounted on the feed platen unit 4 so as to cover the exposed light diffusion plate (not shown). The feed platen unit 4 is pivoted about the hinges 32 and is closed.

When the operator starts reading the transparent original F from the operation unit 30 (FIGS. 6 and 7) in this state, the controller 620 turns on the transparent original light source 22 and at the same time, controls the optical unit driving unit 650. The optical unit driving unit 650 causes the optical unit 6 to read an image of the transparent original F while translating the optical unit 6 in the sub-scanning direction immediately below the transparent original F. When the reading of a predetermined transparent original reading range is complete, the process ends.

The read image can be displayed on the screen of the external device 500 such as a host computer through the input/output unit 610, can be displayed on the display unit 31 or the like of the apparatus main body, or can be output from the printing unit 50 in the apparatus main body.

The operation of the image reading/printing apparatus according to this embodiment when a necessary frame is selected from a transparent original having a plurality of frames and is output from the printing unit 50 without the external device 500 will be described next.

In this embodiment, to perform such processing, a film is temporarily prescanned (scanned at a low resolution). Then, all frame images recorded on the scanned film are laid out on one navigation sheet (or index sheet) N having an additional information designation field for each image and are output from the printing unit 50.

Selection of a frame image to be output and designation of the additional information including the print size and number of print are performed by filling in the additional information designation field by the operator. The completed navigation sheet is set on the automatic document feeder 2. When a read instruction is issued, reading is performed using the automatic document feeder 2, and entries made in the navigation sheet (selected image and additional information (size, number of print, and the like) for use in printing) are recognized.

The film set at the time of prescanning is scanned (scanned at high resolution suitable for printing in the printing unit 50), and the printing process is performed on the basis of information recognized from the navigation sheet. With this operation, the plurality of images contained in the transparent original can selectively and flexibly be printed without the external device 500.

To carry the procedure, the following operation needs to be performed: prescanning of the transparent original→scanning using the completed navigation sheet as a reflection original→rescanning of the transparent original. To read the completed navigation sheet as a fixed original in this example, the reader must temporarily be set for a reflection original after prescanning of the transparent original in the first step, and the reader must be set afresh for scanning (at high resolution). This operation involves mounting/removal of the original mat 23 and the like and is troublesome. For this reason, in this embodiment, the completed navigation sheet is read using the automatic document feeder 2. This makes it possible to perform scanning while keeping a state wherein a transparent original is set at the time of prescanning.

This process will be described in detail below with reference to the flowchart in FIG. 10.

First, the operator sets in advance the transparent original F such as a photographic film in which a plurality of images are recorded and mounts the film holder 29 on the feed platen unit 4.

Figure 4:
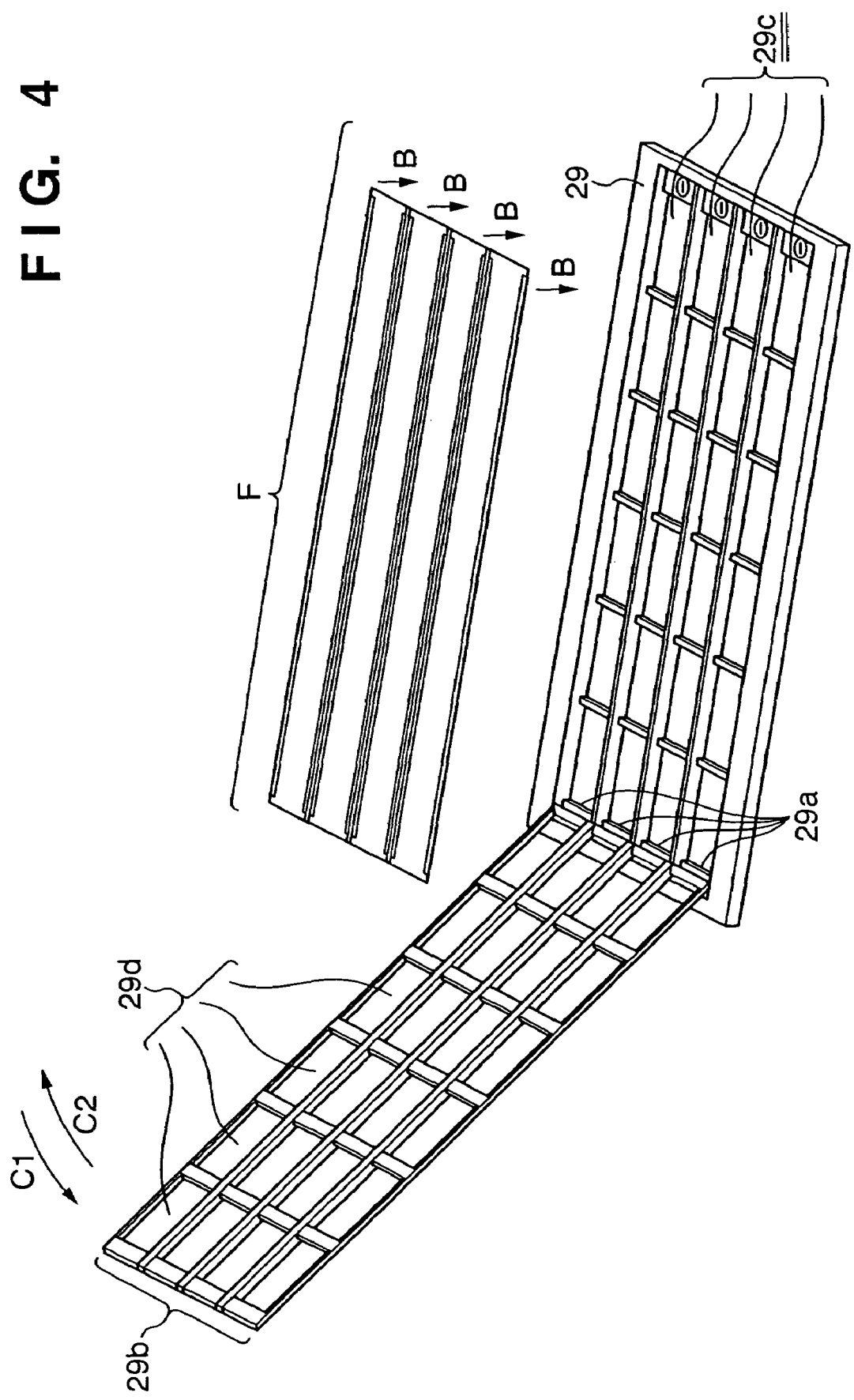
FIG. 4 is a perspective view showing an arrangement example of a film holder which can be used in the image reading/printing apparatus according to the embodiment of FIG. 1.
Figure 5:
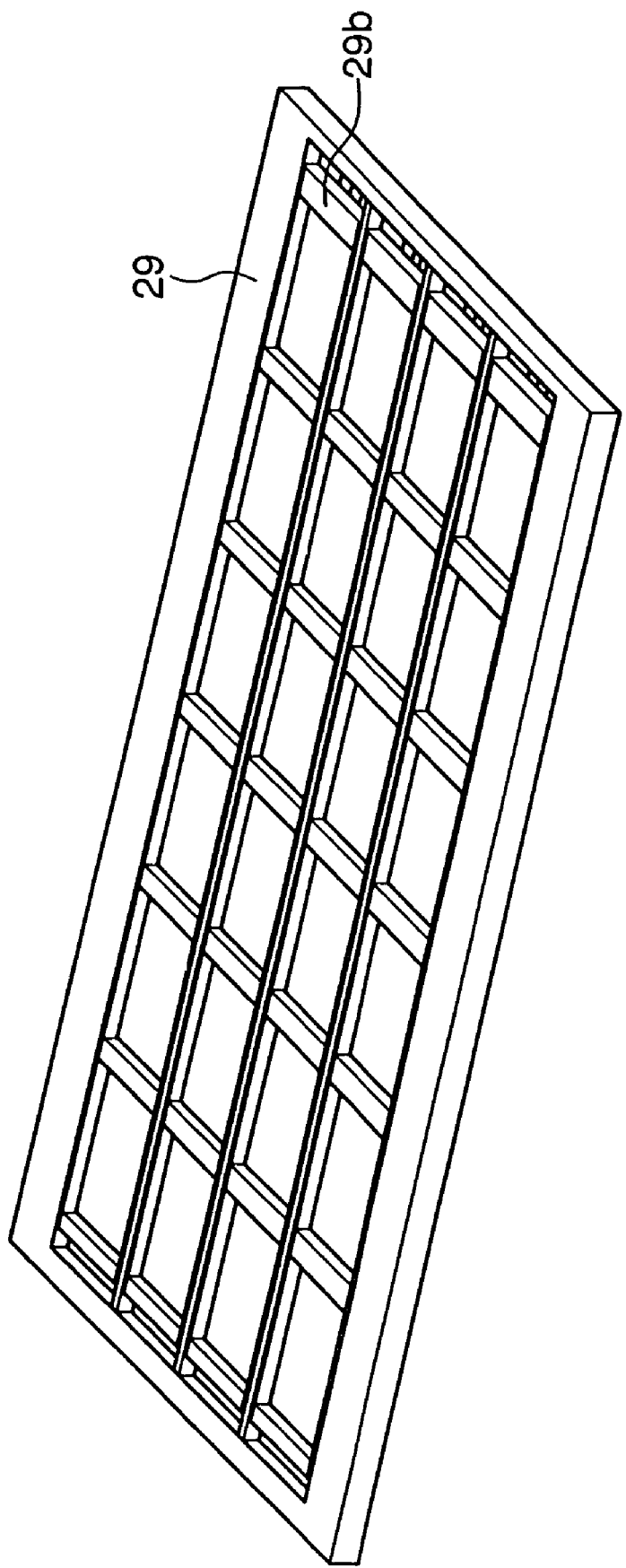
FIG. 5 is a perspective view showing a state wherein a film is mounted in the film holder of FIG. 4.

The arrangement of the film holder 29 will be described briefly with reference to FIGS. 4 and 5. FIG. 4 is a view of an example showing the arrangement of the film holder 29. In this example, four general 35-mm photographic films F (six frames), i.e., 24 frames at most can be set in the film holder. Note that the film size is not limited to 35 mm.

Referring to FIG. 4, holes are formed in the film holder 29 to have a lattice pattern such that the four films F (six frames) can be set. The holes fix the films F. A pressure member 29b is provided to suppress warpage of the films F and smooth them. The operator first pivots the pressure member 29b of the film holder 29 about hinges 29a in a direction of an arrow C1 to open film storage units 29c. The films F containing images to be output are set in the open film storage units 29c in a direction of an arrow B. Then, the pressure member 29b is pivoted about the hinges 29a in a direction of an arrow C2 to close the film storage units 29c (FIG. 5). Rectangular holes 29d corresponding in size to the frames are formed such that the frame images of the films F can be read in this state. In the state of FIG. 5, the film holder is mounted on the feed platen unit 4.

When an instruction to output the navigation sheet is issued in this state by pressing a predetermined key of the operation unit 30 or selecting one from menu items displayed on the display unit 31, the operation shown in the flowchart of FIG. 10 starts.

First, the controller 620 moves the optical unit 6 to a transparent original reading start position (FIG. 2) (S101). Prescanning is performed using predetermined prescanning parameters (e.g., resolution, reading color depth, and the like) (S103). Frame images are separated by, e.g., recognizing holder frames from the prescanning result, are laid out on the navigation sheet, and are printed from the printing unit 50 (S105).

An example of the navigation sheet N output in step S105 will be described briefly with reference to FIG. 8.

FIG. 8 is a view showing the example of the navigation sheet N output when films are set in the film holder 29 described with reference to FIGS. 4 and 5 and are prescanned. As shown in FIG. 8, the navigation sheet N is printed in a size which allows printing of the printing unit 50 and allows reading using the automatic document feeder 2. In this case, frame images obtained by prescanning are reduced/enlarged and are subjected to image processing such as negative/positive conversion, as needed. The frame images are printed as, e.g., a 6-by-4 image array in the order in which they are set in the film holder 29.

There are margins between the frame images to be printed. Fields for additional information (printing conditions) necessary for scanning and printing are provided on the margins. In this embodiment, each field has a mark sheet format. The number of print (0, 1, 2, or 3), print size (L, 2L, or postcard), and printing paper type (plain paper or photo paper (printing paper for printing photos)) can be entered in the field as the additional information. The number and types of items in each field and the number and types of choices for each item can arbitrarily be set. Other examples of items include the presence/absence of print frame, the presence/absence of date, and the like.

The operator can enter or designate additional information by marking the mark sheet in the field corresponding to each frame image (white circles o are drawn for each item of additional information, and any of the circles is filled in with black •: see FIG. 8). FIG. 8 shows an example wherein two images, i.e., the first and second frame images are prescanned, and pieces of additional information are designated for the images. One piece of additional information indicates that the number of print of Image 1 is set to 0, and Image 1 is not output. The other piece indicates that Image 2 is output in L size on a photo paper. In this embodiment, the choices for the number of print include 0 to explicitly designate not to output a corresponding image. A choice 0 is unnecessary in an arrangement in which an image with no mark is recognized as not being output. The operator sets the completed navigation sheet on the original tray T of the automatic document feeder 2. The operator gives an instruction to perform scanning by pressing a predetermined key of the operation unit 30 or selecting one from menu items displayed on the display unit 31.

Referring back to FIG. 10, when the navigation sheet is output, the controller 620 shifts to a scanning instruction waiting state (S107). At this time, on the platen glass 15, the film holder 29, in which the films F are accommodated, is mounted in the feed platen unit 4. For example, when an instruction to perform scanning is issued, as described above, the controller 620 confirms whether an original is set on the original tray T of the automatic document feeder 2 (S109). If no original is set, the controller 620 notifies the operator of the absence of original by, e.g., displays a message on the display unit 31 prompting the operator to set the navigation sheet or playing back a prestored voice message (S111).

If any original is set, the controller 620 controls the optical unit driving unit 650 to move the optical unit 6 to an automatic feed original reading position (FIG. 1) (S113). As described with reference to FIG. 1, the original is conveyed and read. More specifically, the navigation sheet N set on the original tray T is conveyed through the original convey path (U-turn path) 5, and images on the navigation sheet N are read by the optical unit 6 fixed at the reading position. Fields of the navigation sheet are recognized from the read images (S115).

If the recognition results in accurate detection (without any contradiction) of images to be output and the corresponding pieces of additional information, the flow shifts to step S117 to move the optical unit 6 to the transparent original reading position. On the other hand, if the recognition causes any problem, the operator is prompted to perform reading again, and the flow returns to step S107.

In step S119, scanning is performed using predetermined reading parameters for scanning. An instruction for output is issued to the printing unit 50 on the basis of the read image data and additional information recognized in step S115. The reading parameters for scanning may be set on the basis of the additional information (printing conditions) recognized in step S115. In this case, the reading resolution of scanning may be set on the basis of the print size (L, 2L, or postcard) recognized from the navigation sheet N.

As described above, according to this embodiment, a desired image can easily and reliably be printed and output under desired conditions from a transparent original such as a photographic film in which a plurality of images are recorded, without an external device such as a host computer. An image to be output is selected not using screen display but using a printed/output navigation sheet. For this reason, without a large display device for the apparatus, the desired image can be selected while comparing a plurality of images with each other. Since printing is performed at a higher resolution than screen display, selection can be performed easily even if there are a plurality of similar images.

Since the navigation sheet is read using the automatic document feeder 2, the film holder 29 and original mat 23 need not be operated after prescanning of a transparent original. Processing from reading of the navigation sheet N to scanning can be performed without moving any units. This makes it possible to increase the operability.

As the printing unit 50, an electrophotographic or ink-jet image printing unit or the like can be used. The present invention, however, is not limited to this. Any other suitable image printing unit can be used.

The embodiment has described an example of an image reading/printing apparatus which integrally includes an image reading apparatus and printing apparatus. However, the present invention can be applied to an arrangement in which an image scanner serving as the image reading apparatus and a printer serving as the image printing apparatus are separately provided.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-9549 filed on Jan. 16, 2004, the entire contents of which is hereby incorporated by reference herein.

What is claimed is:

1. An image reading apparatus comprising:
   an original table on which a transparent original can be set;
   a feed platen unit coupled to the original table so that the feed platen unit can be opened and closed;
   a transparent original light source, which is provided in the feed platen unit, for illuminating a transparent original set on the original table;
   an automatic document feeding unit for automatically feeding a reflection original;
   an optical unit being movable under the original table and being capable of (a) reading light from the transparent original light source which light is transmitted through the transparent original, (b) illuminating an reflection original set on the original table, and (c) reading light reflected by the reflection original;
   a printing unit for outputting an index sheet; and
   a control unit for controlling an operation of the image reading apparatus,
   wherein the control unit controls the image reading apparatus to be able to perform the following steps:
   prescanning a transparent original set on the original table, using the transparent original light source and the optical unit;
   outputting, using the printing unit, an index sheet on which are laid out the prescanned image and a field for specifying additional information relating to the corresponding prescanned image;
   reading, using the optical unit, the index sheet on which the additional information is specified, while the transparent original remains on the original table, said index sheet being fed by the automatic document feeding unit; and
   scanning, using the transparent original light source and the optical unit, the transparent original on the original table in accordance with the additional information specified on the read index sheet.

2. The apparatus according to claim 1, further comprising a movement unit adapted to move the optical unit,
   wherein when an original set on the original table is to be read, the original set on the original table is read while said movement unit moves the optical unit with respect to the original set on the original table, and when an original fed by the automatic document feeding unit is to be read, the original fed by the automatic document feeding unit is read while the optical unit is stopped at a predetermined position that falls outside a range in which the optical unit is moved when reading the original set on the original table.

3. The apparatus according to claim 1, wherein a reading resolution when prescanning the transparent original by the optical unit to output the index sheet by the printing unit is lower than a reading resolution when scanning the transparent original after the index sheet is read by the optical unit.

4. The apparatus according to claim 1, wherein the additional information specified on the index sheet includes at least one of a number of print, print size, and printing paper type used for printing of the scanned image by the printing unit.

5. The image reading apparatus according to claim 1, wherein the transparent original includes a plurality of images, and the index sheet includes prescanned images of the plurality of images corresponding to a field for specifying that additional information is provided for each of the plurality of images.

6. The image reading apparatus according to claim 1, further comprising:
   an original set detecting unit for determining whether the index sheet is set or not; and
   a notifying unit for providing a notification to an operator if it is not determined that the index sheet is set.

7. A computer-readable medium encoded with a computer program for controlling an image reading apparatus including an original table on which a transparent original can be set, a feed platen unit coupled to the original table so that the feed platen unit can be opened and closed, a transparent original light source, which is provided in the feed platen unit for illuminating a transparent original set on the original table; automatic document feeding unit for automatically feeding a reflection original, an optical unit being movable under the original table and being capable of (a) reading light from the transparent original light source which light is transmitted through the transparent original, (b) illuminating an reflection original set on the original table, and (c) reading light reflected by the reflection original; a printing unit for outputting an index sheet; and a control unit for controlling an operation of the image reading apparatus,
   wherein the program controls the image reading apparatus to perform the following steps:
   prescanning a transparent original set on the original table using the transparent original light source and the optical unit,
   outputting, using the printing unit, an index sheet on which are laid out the prescanned image and a field for specifying additional information relating to the corresponding prescanned image;
   reading, using the optical unit, the index sheet on which the additional information is specified, while the transparent original remains on the original table, said index sheet being fed by the automatic document feeding unit; and
   scanning, using the transparent original light source and the optical unit, the transparent original on the original table in accordance with the additional information specified on the read index sheet.

* * * * *